United States Patent [19]
Stuart et al.

[11] Patent Number: 5,985,006
[45] Date of Patent: Nov. 16, 1999

[54] GAS SEPARATION

[75] Inventors: David Mark Stuart, Elstead; John Robert Coates, Farnham, both of United Kingdom

[73] Assignee: The BOC Group plc, Windlesham, United Kingdom

[21] Appl. No.: 09/019,400

[22] Filed: Feb. 5, 1998

[51] Int. Cl.[6] .................................................. B01D 53/047
[52] U.S. Cl. .............................. 96/114; 96/122; 96/130; 96/144
[58] Field of Search ............................ 95/96–105, 130; 96/108, 114, 122, 130, 143, 144

[56] References Cited

U.S. PATENT DOCUMENTS

| | | | |
|---|---|---|---|
| 2,273,350 | 2/1942 | Fry et al. | 95/97 X |
| 2,747,681 | 5/1956 | Schuftan et al. | 95/99 X |
| 2,773,774 | 12/1956 | McCarthy et al. | 95/104 X |
| 3,691,728 | 9/1972 | Vautrain et al. | |
| 3,696,588 | 10/1972 | Dussourd et al. | 96/143 X |
| 3,899,684 | 8/1975 | Tenney | 96/130 X |
| 3,922,218 | 11/1975 | Wanless . | |
| 4,314,828 | 2/1982 | Saito et al. | 96/130 X |
| 4,331,456 | 5/1982 | Schwartz et al. . | |
| 4,425,142 | 1/1984 | Mann | 96/130 X |
| 4,813,977 | 3/1989 | Schmidt et al. | 95/130 X |
| 5,122,164 | 6/1992 | Hirooka et al. | 95/98 X |
| 5,137,547 | 8/1992 | Chretien | 95/97 X |
| 5,313,781 | 5/1994 | Toda et al. | 93/130 X |

FOREIGN PATENT DOCUMENTS

| | | |
|---|---|---|
| 0 015 413 | 2/1980 | European Pat. Off. . |
| 0 701 967A1 | 3/1996 | European Pat. Off. . |
| 54-162697 | 12/1979 | Japan . |
| 2 155 805 | 10/1985 | United Kingdom . |

Primary Examiner—Robert H. Spitzer
Attorney, Agent, or Firm—David M. Rosenblum; Salvatore P. Pace

[57] ABSTRACT

A vacuum swing adsorption apparatus for separating a gas mixture includes a pipeline along which the vacuum is able to be drawn. The apparatus is provided with a plurality of eductors each connected to the pipeline 6 and in parallel with the other eductor respective stop valves. The stop valves are arranged and operable so as to select the number of eductors in communication with the pipeline. Thus the degree of vacuum to which the apparatus is subjected may be varied.

5 Claims, 1 Drawing Sheet

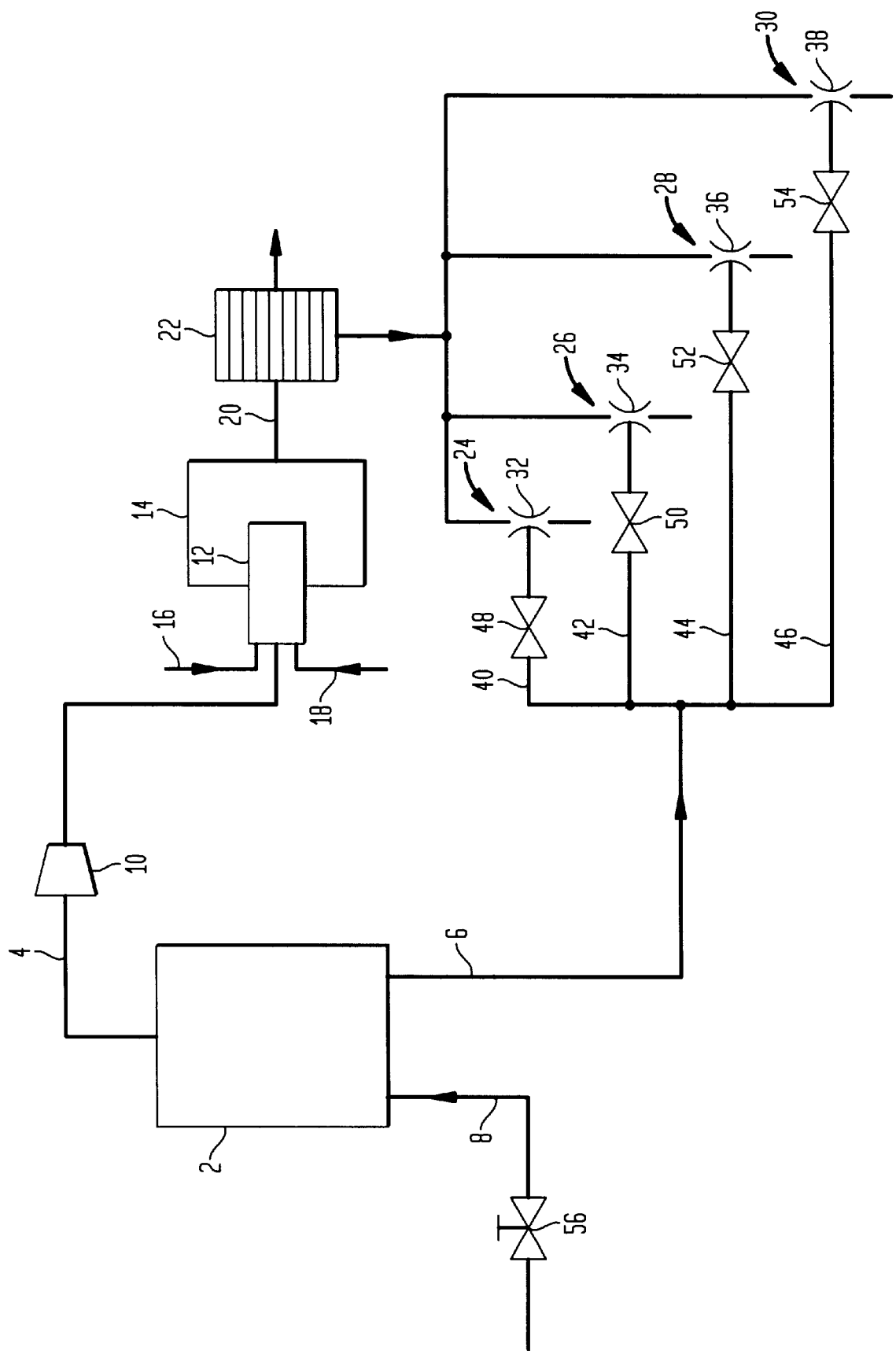

GAS SEPARATION

BACKGROUND OF THE INVENTION

This invention relates to gas separation. In particular, it relates to a vacuum swing adsorption apparatus for separating a gaseous mixture, for example air.

There is a continuing search for more economical methods of separating air. Some of these methods are directed at improving the thermodynamic efficiency of air separation processes. Others are directed at finding inexpensive sources of power. One such source is the waste heat that is typically evolved from an oxidation reaction. It is known to employ such waste heat to raise steam and to expand the pressurized steam in a turbine which may be directly coupled to a compressor forming part of the air separation plant or which may alternatively be coupled to a generator of electrical power. Alternatively, a compressed nitrogen stream from the air separation plant may be raised in temperature by the waste heat and expanded in an expansion turbine. The expansion turbine may be directly coupled to a compressor forming part of the air separation plant or to a generator of electrical power.

One disadvantage of such arrangements is that they add very considerably to the total capital cost of the plant and they tend not to lend themselves for use when there is a need to vary the output of electrical power.

Japanese patent application 54-162697A discloses a process in which an oxygen-enriched gas containing 40% by volume is separated by means of membranes from air. The oxygen-enriched gas is the permeate gas. A vacuum is drawn on the permeate gas side of the membranes in order to facilitate the separation of the oxygen-enriched gas. The oxygen-enriched gas is supplied to a furnace. Waste heat from the furnace is employed in raising steam. The steam flows through an eductor which draws the vacuum. Such an arrangement is however unsuitable for practical use because the steam contaminates the oxygen-enriched product. It is therefore necessary to disengage liquid water from the resulting oxygen-enriched gas. It is also necessary to ensure that the steam contains no impurity that might be hazardous in the presence of the oxygen-enriched gas.

It is well known to separate air by vacuum swing adsorption. A motor driven vacuum pump such as a Rootes blower is used to draw the vacuum. Such vacuum pumps are prone to failure. Further, vacuum swing adsorption apparatus including such a vacuum pump tends to have relatively poor turndown characteristics and is therefore not suitable for use in meeting a variable demand for a gaseous product.

It is an aim of the present invention to provide an apparatus which ameliorates at least one and preferably all of these disadvantages.

SUMMARY OF THE INVENTION

According to the present invention there is provided vacuum swing adsorption apparatus for separating a gas mixture, including a pipeline through which the vacuum is able to be drawn, wherein there are a plurality of eductors each connected to the pipeline and in parallel with the other eductors, and one or more first on-off valves associated with the eductors, arranged and operable so as to select the number of eductors in communication with the pipeline.

By employing an eductor or eductors to draw the vacuum the capital and running costs of a conventional motor-driven vacuum pump are avoided. Further, the maintenance periods and downtime associated with such pumps can be greatly reduced. The vacuum swing adsorption method and apparatus according to the invention does not make necessary the use of a steam turbine or gas expansion turbine. Further, because the product gas stream is typically not adsorbed, it need not come into contact with the pressurized steam that draws the vacuum and therefore there is no risk of contamination of the product gas by the steam.

The steam may be provided at any convenient elevated pressure. Pressures in the range of between about 5 to about 60 bar are generally suitable.

The apparatus according to the invention is particularly suited to supplying an oxygen-enriched gas stream to support combustion of part of a hydrogen sulphide stream in a Claus process. In this example, the oxygen-enriched gas stream is preferably supplied separately from an air stream to a burner which fires into a furnace in which take place combustion of hydrogen sulphide and reaction between resulting sulphur dioxide and residual hydrogen sulphide to form sulphur vapor. In this example, the source of the pressurized steam supplied to the eductor may be a waste heat boiler associated with the furnace.

The Claus process is but an example of a process in which the flow of feed fluid varies and therefore the demand for oxygen varies. When supplying oxygen to such a process it is desirable to have the ability to vary its flow. A particular advantage of the apparatus according to the invention is that it lends itself to production of product gas stream at a variable flow rate and therefore can readily follow changes in the flow rate of an acid gas stream into the Claus process.

The first on-off valves are preferably automatically operable.

Preferably, the vacuum swing adsorption apparatus according to the invention also includes a plurality of second automatically operable on-off valves each operable to place a different adsorbent bed in communication with the pipeline, and means for selecting the duration of each period for which one of the second automatically operable on-off valves is open according to the number of eductors that are to communicate with the pipeline during the period.

Preferably there is means for automatically selecting the number of the first automatically operable on-off valves that are open in accordance with the demand for product gas.

The vacuum swing adsorption apparatus preferably includes a plurality of adsorbent beds operating out of phase with one another. During each period in which one bed is subjected to a vacuum, another bed receives a flow of gas mixture to be separated and preferentially or more rapidly adsorbs one component of the gas mixture (in comparison with the other component(s)). It is desirable in a vacuum swing adsorption apparatus according to the invention to cater for variations in the duration of the periods in which each bed is subjected to the vacuum by making concomitant variations in the flow rate of gas mixture to be separated into the apparatus (typically by means of a flow control valve in a pipeline for gas mixture communicating with the apparatus) or preferably by arranging for there to be a dwell period, if necessary, at the end of selected adsorption steps.

BRIEF DESCRIPTION OF THE DRAWINGS

The apparatus according to the invention will now be described by way of example with reference to the accompanying drawing which is a schematic flow diagram of a plant including a vacuum swing adsorption apparatus and a furnace for reacting hydrogen sulphide with oxygen.

DETAILED DESCRIPTION OF THE INVENTION

Referring to the drawing, the illustrated plant includes a vacuum swing adsorption apparatus 2. Vacuum swing adsorption is the term applied to pressure swing adsorption in which the minimum desorption pressure that obtains is below atmospheric pressure. The vacuum adsorption apparatus 2 may be of any known kind. In this example it is of the kind shown in FIG. 1 of U.S. Pat. No. 5,122,164 and may operate using any one of the cycles illustrated in FIGS. 2, 3 and 4 of U.S. Pat. No. 5,122,164. U.S. Pat. No. 5,122,164 is incorporated herein by reference. It should be noted however that the vacuum pump 16 shown in FIG. 1 of U.S. Pat. No. 5,122,164 is omitted and is replaced by a bank of steam eductors as will be described below.

The vacuum swing adsorption apparatus 2 has associated therewith a first pipeline 4 for a gaseous oxygen-enriched product gas typically containing at least about 90% by volume of oxygen, a second pipeline 6 through which the vacuum is drawn, and a third pipeline 8 through which air is fed into the plant. A compressor 10 is located within the first pipeline 4.

In operation, a continuous flow of the oxygen-enriched gas is supplied by the compressor 10 to a burner 12 which fires into a furnace 14 which forms part of a plant for recovering sulphur by the Claus process from a hydrogen sulphide containing gas stream. The burner 12 is also supplied with a flow of air via a pipeline 16 and a flow of an acid gas mixture, typically comprising at least about 40% by volume of hydrogen sulphide, and typically other combustible gases such as hydrocarbons and ammonia, and also carbon dioxide, via a pipeline 18. The relative flow of oxygen molecules to hydrogen sulphide and other combustible molecules into the burner 12 is arranged such that a part of the hydrogen sulphide is burnt with the result that sulphur dioxide and water vapor are formed. Some of the sulphur dioxide reacts in the furnace 14 with residual hydrogen sulphide to form sulphur vapor and water vapor. The configuration and operation of the furnace 14 and the burner 12 is substantially as described in EP-A-0 701 967 except that air is supplied to the burner instead of carbon dioxide. European Patent Application No. 0 701 967 is incorporated herein by reference.

A gas mixture comprising hydrogen sulphide, sulphur dioxide, water vapor, sulphur vapor, carbon dioxide and nitrogen leaves the furnace 14 through an outlet 20 at a temperature of up to 1650° C. The gas mixture flows to a waste heat boiler 22 in which it is cooled and in which steam is raised at an elevated pressure. The resulting cooled gas mixture flows through the rest of the Claus plant (not shown in the drawing) which typically comprises the units 14, 16, 18, 20 and 22 shown in FIG. 1 of EP-A-0 701 967. The reader is referred to EP-A-0 701 967 for further information about these units and their operation.

At least part of the high pressure steam raised in the waste heat boiler 22 is distributed to a bank of four eductors 24, 26, 28 and 30 arranged in parallel with one another. The eductors 24, 26, 28 and 30 have throats 32, 34, 36 and 38, respectively. The throats 32, 34, 36 and 38 communicate with conduits 40, 42, 44 and 46, respectively, each of which is connected to the second pipeline 6. The conduits 40, 42, 44 and 46 have automatically operable on-off valves 48, 50, 52 and 54, respectively, located therein.

In operation, when all the automatically operable on-off valves 48, 50, 52 and 54 are open, the flow of high pressure steam through each of the eductors 24, 26, 28 and 30 causes a vacuum to be drawn in each of the conduits 40, 42, 44 and 46, and in the second pipeline 6. Referring again to FIG. 1 of U.S. Pat. No. 5,122,164 and its description therein, the vacuum swing adsorption apparatus includes two adsorbent beds A and B in parallel with one another. The adsorbent bed A is able to be placed in communication with a source of vacuum by opening the valve 2A, and the adsorbent bed B is similarly able to be placed in communication with the source of vacuum by opening the valve 7B. When the vacuum swing adsorption apparatus 2 shown in the accompanying drawing is provided by the apparatus shown in FIG. 1 of U.S. Pat. No. 5,122,164, and, say, the valve 2A is open, the bed A is subjected to the vacuum drawn in the second pipeline 6 shown in the accompanying drawing. Initially, upon opening the valve 2A, the adsorbent bed A is at a pressure substantially above the minimum pressure that obtains in the vacuum swing adsorption process. By subjecting the bed A to a vacuum the minimum pressure is achieved. The time taken from opening the valve 2A shown in FIG. 1 of U.S. Pat. No. 5,122,164 to the achievement of the minimum pressure depends on how many of the valves 48, 50, 52 and 54 are open together. If all four of the valves 48, 50, 52 and 54 are open together, the time taken is at a minimum; if only one is open, the time taken is at a maximum. An intermediate time can be achieved by having either two or three of the valves 48, 50, 52 and 54 open together. When the valve 7B of the apparatus shown in FIG. 1 of U.S. Pat. No. 5,122,164 is open the bed B is subjected to the vacuum, and the time taken to reach a minimum pressure can be varied by selecting which of the valves 48, 50, 52 and 54 are open.

The longer the time taken to reach the minimum pressure, the longer the duration of each cycle of the vacuum swing adsorption process and the lower the rate of supplying oxygen-enriched air from the apparatus 2. In practice, a Claus plant for the recovery of sulphur from an acid gas stream is subjected to a widely varying load and difficulties arise in operating conventional pressure swing or vacuum swing adsorption oxygen generators to meet this load. The method and apparatus according to the invention can, however, follow a varying demand for oxygen. The apparatus shown in the accompanying drawing may be arranged such that when the rate of supply of acid gas to the Claus plant is at a maximum all four of the valves 48, 50, 52 and 54 are open together. Typically, if only one of the valves 48, 50, 52 and 54 is open, the rate of oxygen production can be approximately halved. Thus, the rate of oxygen production can be turned down in steps or directly by up to about one-half. The number of different oxygen supply rates that are possible depends on the number of steam eductors that are used.

In order to effect the operation of the valves, 48, 50, 52 and 54 the apparatus shown in the accompanying drawing is provided with a valve controller (not shown). There is typically a single valve controller which in addition to switching the valve 48, 50, 52 and 54 on and off according to a predetermined program also similarly switches on and off all the on-off valves shown in FIG. 1 of U.S. Pat. No. 5,122,164. If desired, a flow meter may be located in the acid gas pipeline 18 and arranged to generate a signal representative of the flow rate therethrough. This signal is transmitted to the valve controller which determines which of the valves 48, 50, 52 and 54 are open at any one time. Alternatively, if the flow rate of the acid gas is varied by changing the setting of a flow control valve (not shown), the valve controller can respond directly to this change of setting.

The valve controller may also adjust the operation of the adsorption steps of the vacuum swing adsorption process in concert with adjustment of the bed regeneration steps in which the adsorption beds are subjected to a vacuum. If the time taken from the opening of the valve 2A or 7B shown in FIG. 1 of U.S. Pat. No. 5,122,164 to the achievement of a minimum pressure is increased by reducing the number of valves 48, 50, 52 and 54 that are open, steps are taken to ensure that impurities do not break through the adsorbent bed during an adsorption step and thereby reduce the purity of the product oxygen-enriched gas to below that specified for it. For example, referring to FIG. 2 of U.S. Pat. No. 5,122,164, selecting a reduced number of the valves 48, 50, 52 and 54 will typically lengthen the period of time required for the right hand bed, as shown, in FIG. 2C to be regenerated during step 3 of the illustrated vacuum swing adsorption cycle. If desired, referring again to the accompanying drawing, a flow control valve 56 may be located in the feed air pipeline 8 and its setting selected in accordance with the number of the valves 48, 50, 52 and 54 that are open. If there is a reduced number of these valves open, the setting of the flow control valve 56 is chosen so as to reduce the flow rate of air into the vacuum swing adsorption apparatus 2. Accordingly, the duration of the adsorption step performed by the left hand, as shown, bed in FIG. 2C of U.S. Pat. No. 5,122,164 can be adjusted in concert with the duration of the regeneration step performed by the right hand bed. Alternatively, the flow control valve 56 may be omitted and the adsorption step permitted to end before the vacuum regeneration step (FIG. 2C of U.S. Pat. No. 5,122,164) when the vacuum swing adsorption apparatus is producing oxygen at a turned down rate. In such examples during those periods of the cycle in which the adsorption step has ended but the regeneration step continues, the adsorbing bed is isolated from the feed gas and from the product reservoir. Thus, referring again to FIG. 1 of U.S. Pat. No. 5,122,164, with the bed A having completed the adsorption step before the bed B has been regenerated, the valves 1A and 4A are closed. The bed A thus dwells in isolation until the end of the regeneration of bed B, whereupon both beds move onto the next step of the vacuum swing adsorption cycle. Various means may be employed for sensing when the adsorption step is complete. For example, the oxygen partial pressure in the product pipeline 4 may be monitored, or the pressure in the respective adsorption bed may be monitored.

The oxygen supply pressure is typically in the range of 1.5 to 2 bar and the steam is typically supplied to the eductors at a pressure of about 40 bar although lower or higher steam pressures can be used.

Various modifications and additions may be made to the plant shown in the accompanying drawing. For example, the air feed pipeline 8 may be provided with a blower (not shown) to assist flow of the air. Alternatively, the compressor 10 may be omitted and replaced by a compressor (not shown) in the air feed pipeline 8. Arrangements may be made to isolate any of the eductors 24, 26, 28 and 30 which for the time being is not being used to evacuate an adsorbent bed from the supply of steam. Those of the eductors 24, 26, 28 and 30 that are on line may be arranged to vent their steam to a stack. If desired, some or all of the steam may be supplied from a source other than the waste heat boiler 22. For example, some of the steam may be supplied from one or more sulphur condensers forming part of the Claus plant.

Another modification that can be made is to omit one of the valves 48, 50, 52 and 54. Accordingly, one eductor is permanently in communication with the second pipeline.

We claim:

1. An apparatus for separating a gas mixture, including:

a vacuum swing adsorption apparatus;

a pipeline through which vacuum for the vacuum swing adsorption apparatus is drawn;

a plurality of eductors each connected to the pipeline and in parallel with the other eductors; and at least one first on-off valve associated with the eductors;

the at least one first on-off valve arranged and operable so as to select the number of eductors in communication with the pipeline.

2. The apparatus according to claim 1, in which the at least one first on-off valve has means for automatic operation (is automatically operable).

3. The apparatus according to claim 2, additionally including means for enabling a dwell period at the end of a selected adsorption step in which a bed of said vacuum swing adsorption apparatus dwells in isolation.

4. The apparatus according to claim 1, in which there are a plurality of the at least one first on-off valves and in which the apparatus additionally includes means for automatically selecting the number of the plurality of the at least one first on-off valves that are open in accordance with the demand for product gas.

5. The apparatus according to claim 1, additionally including a flow control valve in another pipeline for feeding said gas mixture to be separated to the apparatus and means for adjusting the setting of the flow control valve.

* * * * *